E. W. SNYDER.
PACKING.
APPLICATION FILED JULY 27, 1909.
954,655.
Patented Apr. 12, 1910.
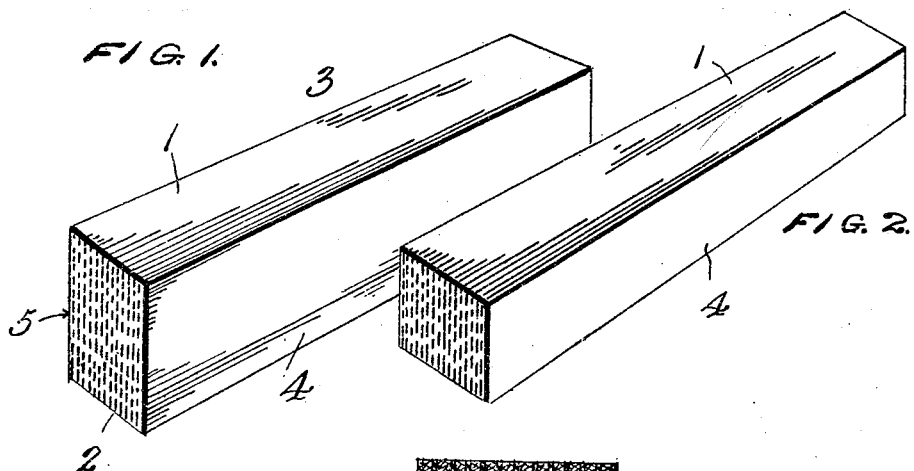
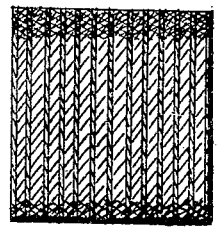
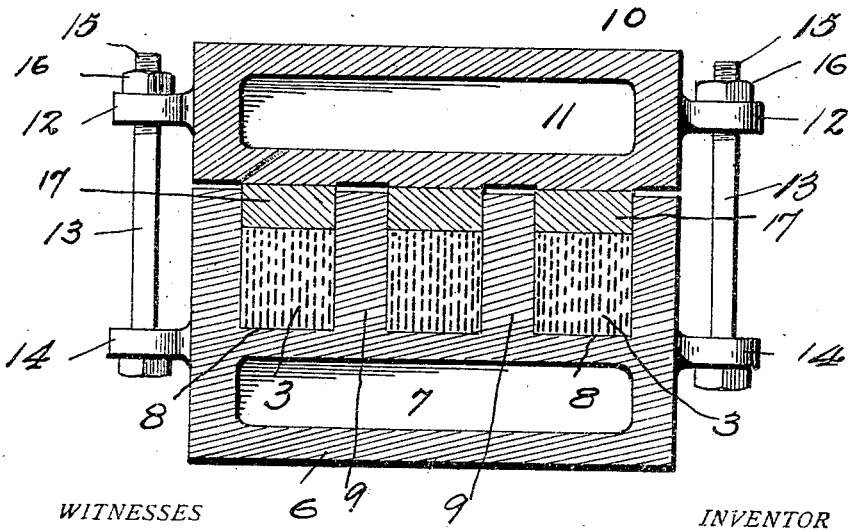
WITNESSES
C. K. Davis
B. P. Fishburne
INVENTOR
E. W. Snyder
Attorney
C. L. Parker

UNITED STATES PATENT OFFICE.

EDGAR W. SNYDER, OF OLATHE, KANSAS.

PACKING.

954,655.  Specification of Letters Patent.  Patented Apr. 12, 1910.

Application filed July 27, 1909. Serial No. 509,778.

*To all whom it may concern:*

Be it known that I, EDGAR W. SNYDER, citizen of the United States, residing at Olathe, in the county of Johnson and State of Kansas, have invented certain new and useful Improvements in Packing, of which the following is a specification.

My invention relates to the production of packing and especially piston-rod packing.

An object of my invention is to produce an improved packing having several qualities and properties resulting from its peculiar manufacture that renders it particularly useful for the piston-rods of steam engines.

My packing will also be found applicable to plungers and moving rods and parts of engines and machinery where a steam-tight or water-tight joint is to be maintained. It will produce a tight joint without abundant or excessive friction upon the rod. It is very pliable and compressible to a high degree; it has the property of retaining and preserving its elasticity and compressibility under wear, and possesses very great durability.

In the accompanying drawings forming a part of this specification, and in which like numeral references are used to designate like parts throughout the same, Figure 1 is a perspective view of a strip of laminated packing in process of production of my present product. Fig. 2 is a similar view of my improved packing produced in accordance with my improved method. Fig. 3 is an enlarged cross-sectional view of my packing shown in Fig. 2. Fig. 4 is a sectional view of a plurality of strips of my packing, and the apparatus within which said strips are placed during a portion of the process for the production of the same.

In the production of my packing, I first coat both sides of a portion of a suitable fabric such as cotton duck, with a high grade elastic adhesive substance, such as rubber, although I may employ any other suitable material for this purpose. I then cut on the the bias the portion of fabric thus treated, into sections of similar sizes, and by placing these sections one upon the other, I build up a laminated slab of packing of suitable thickness. This slab is then subjected to pressure and heat whereby it is suitably cured. The slab is then cut in equal strips which are rectangular in cross-section as shown in Fig. 1. For the sake of clearness, I will refer to the sides 1 and 2 of the strip 3 as the edges thereof, while the surfaces 4 and 5 will be termed sides. Assuming that the strip 3 is standing upon edge as shown in Fig. 1, it will be obvious that the height of the same is greater than its thickness, and that the layers of material forming the same, are arranged in approximately vertical planes. The strip of packing 3 shown in Fig. 1 is then immersed in a bath consisting of cylinder oil, Japan-wax and graphite. This immersion is very important and is one of the principal features of my process. The strip 3 after being immersed as above described, is placed edgewise in a mold, where it is subjected to pressure and heat which cause the cylinder oil and Japan-wax to penetrate the pores of the threads of the fabric within the same, while the graphite is forced into the edges 1 and 2, penetrating the minute interstices of the same, and forming a smooth wearing surface for said strip.

The machine that I employ for compressing the strip 3 as above described, is illustrated in Fig. 4. This machine comprises a bottom portion 6, having the steam cavity 7 therein, and above said steam cavity 7 are a plurality of equal chambers 8 formed by the spaced vertical partition strips 9 arranged upon said bottom portion 6. A vertically movable top portion 10 provided with the steam cavity 11, has the laterally extending apertured ears 12, through which extend bolts 13 which extend through ears 14 upon said bottom portion 6, said bolts 13 being provided with screw-threaded upper ends 15 adapted to receive the nuts 16, whereby said portion 10 may be vertically adjusted with relation to said portions 6. Strips 17 are arranged upon the upper edge of the packing strips 3, and adapted for engagement with the upper portion 10 as the same is forced downwardly. It is obvious that the amount of compression which the packing strips 3 are subjected to is regulated by the thickness of the strips 17.

If desired, the entire mold shown in Fig. 4 may be placed within a hydraulic press and the top portion 10 forced downwardly by the same, without adjusting the bolts 16.

While the apparatus shown in Fig. 4 is particularly well adapted to compress my packing strips, yet I may employ any other suitable apparatus.

Having fully described my invention, I claim:

1. That improvement in the art of producing a packing which comprises the immersion of a laminated strip in a bath containing cylinder oil, Japan-wax, and graphite.

2. That improvement in the art of producing a packing which comprises the immersion of a strip composing the same, in a bath containing cylinder oil, Japan-wax, and graphite.

3. That improvement in the art of producing a packing which comprises the immersion of a laminated strip in a bath containing cylinder oil, Japan-wax, and graphite, and then subjecting said laminated strip to pressure and heat.

4. That improvement in the art of producing a packing which comprises the immersion of the packing in a bath containing cylinder oil, Japan wax, and graphite, and then subjecting said packing to pressure and heat.

5. That improvement in the art of producing laminated fabric packing which comprises the immersion of such packing in a bath of cylinder oil, Japan-wax, and graphite, and then subjecting said packing to pressure and heat.

6. That improvement in the art of producing laminated fabric packing which comprises the immersion of such packing in a bath of cylinder oil, Japan-wax, and graphite, then placing said packing upon one of its edges in a suitable mold and applying pressure upon the other edge, and simultaneously subjecting said packing to heat.

7. As an article of manufacture, a packing strip comprising a stack of cemented fabric laminated, said fabric laminæ being saturated with a mixture of cylinder oil, and Japan-wax, and the edges of said laminæ having graphite embedded therein.

8. As an article of manufacture, a packing strip comprising a stack of cemented fabric laminæ, said fabric laminæ being saturated with a mixture of cylinder oil and Japan-wax, the edges of said fabric laminæ having graphite embedded therein by pressure applied to said edges transversely of said laminæ, and said laminæ being simultaneously subjected to heat.

9. As an article of manufacture, packing comprising a stack of fabric laminæ cemented together with rubber, said fabric laminæ being saturated with a mixture of cylinder oil, and Japan-wax, the edges of said fabric laminæ having graphite embedded therein by pressure applied to said edges transversely of said laminæ, and said laminæ being simultaneously subjected to heat.

10. That improvement in the art of producing a laminated fabric packing which comprises the immersion of such packing in a bath of cylinder oil, Japan-wax, and graphite, then placing said packing upon one of its edges in a suitable groove of approximately the same thickness as said packing, applying pressure to the edges of said packing, and applying heat to said packing, substantially as described.

In testimony whereof I affix my signature in presence of two witnesses.

EDGAR W. SNYDER.

Witnesses:
E. McCarthy,
Laura Crane.